United States Patent

Hehl

[11] Patent Number: 5,916,501
[45] Date of Patent: Jun. 29, 1999

[54] PROCESS FOR REGULATING OR CONTROLLING AN INJECTION MOLDING MACHINE

[76] Inventor: Karl Hehl, Arthur-Hehl-Str. 32, D-72290 Lossburg, Germany

[21] Appl. No.: 08/981,609

[22] PCT Filed: Jul. 2, 1996

[86] PCT No.: PCT/DE96/01222

§ 371 Date: Dec. 18, 1997

§ 102(e) Date: Dec. 18, 1997

[87] PCT Pub. No.: WO97/02940

PCT Pub. Date: Jan. 30, 1997

[30] Foreign Application Priority Data

Jul. 11, 1995 [DE] Germany .................. 195 25 141

[51] Int. Cl.[6] .................................................. B29C 45/76
[52] U.S. Cl. .............. 264/40.1; 264/40.5; 264/40.7; 264/328.1; 425/135; 425/145; 425/149; 364/475.05; 364/475.08
[58] Field of Search ................ 264/40.1, 40.5, 264/40.7, 328.1; 425/135, 145, 149, 150; 364/475.05, 475.08

[56] References Cited

U.S. PATENT DOCUMENTS

| 4,961,696 | 10/1990 | Yamamura | 264/40.1 |
|---|---|---|---|
| 5,154,935 | 10/1992 | Kamiguchi et al. | 425/149 |
| 5,342,559 | 8/1994 | Kamiguchi et al. | 264/40.1 |
| 5,514,311 | 5/1996 | Shimizu et al. | 264/40.1 |
| 5,518,671 | 5/1996 | Takizawa et al. | 264/40.1 |
| 5,585,053 | 12/1996 | Arai | 264/40.1 |
| 5,595,693 | 1/1997 | Fujita et al. | 264/40.1 |
| 5,611,975 | 3/1997 | Kamiguchi et al. | 264/40.1 |

FOREIGN PATENT DOCUMENTS

| 0167631 | 1/1986 | European Pat. Off. . |
|---|---|---|
| 0245522 | 11/1987 | European Pat. Off. . |
| 0260328 | 3/1988 | European Pat. Off. . |
| 0264453 | 4/1988 | European Pat. Off. . |
| 0331735 | 9/1989 | European Pat. Off. . |
| 0436732 | 7/1991 | European Pat. Off. . |
| 0528040 | 2/1993 | European Pat. Off. . |
| 0576925 | 1/1994 | European Pat. Off. . |
| 4446857 | 6/1995 | Germany . |

Primary Examiner—Jill L. Heitbrink
Attorney, Agent, or Firm—Venable; Gabor J. Kelemen

[57] ABSTRACT

In a control process speed stages are predetermined for the displacement of a movable unit and a nominal speed curve is derived therefrom. From the nominal speed curve a nominal path/time curve is calculated, from which, in turn, a position reference variable for the speed control is determined. At the time $t_i$ determined for the modification position $s_i$ where the speed level is to be changed for the successive speed stage, the speed of the movable unit is maintained until time $t_{i'}$ which is the moment at which the movable unit actually reaches the modification position $s_i$. Upon this occurrence a triggering is initiated which equates the actual time $t_{i'}$ with the nominal time $t_i$ and which causes the nominal speed course to be superseded by a new nominal speed course progressing from the actual point in time $t_{i'}$. The new nominal speed course corresponds to that portion of the superseded nominal speed course which progresses forwardly from the nominal time $t_i$ at which the movable unit should have reached the modification position $s_i$.

12 Claims, 13 Drawing Sheets

PROCESS FOR REGULATING OR CONTROLLING AN INJECTION MOLDING MACHINE

TECHNICAL FIELD

The invention concerns a process for regulating or controlling an injection molding machine for processing plastifiable materials.

PRIOR ART

A regulation of the motion of a feed screw in an injection molding machine is known-from European Patent No. 264 453. Injection speeds are set and a desired speed curve is constituted therefrom, wherein the transitions between contiguous speed steps are provided with ramps which represent either linear portions or any interpolation between the transition points. The motion of the feed screw is then tracked according to the desired curve within the scope of a regulation, wherein either speed sensors are provided or path values serving as actual values are inputted into the control by a servomotor provided with an incremental path measuring device. Both embodiments have the disadvantage that, on the one hand, the speed sensors or servomotors are expensive and, on the other hand, no direct comparison of comparable measured values is made, so that a time-intensive algorithm is necessary in order to control the machine.

European Patent No. 167 631 discloses an injection regulation in which the motor torque of a servomotor is used as a regulation variable in connection with the injection pressure. This solution too, is costly and time intensive. The same applies to the back pressure regulation according to European Patent No. 245 522 and the pressure regulation according to European Patent No. 260 328.

The prior art mentioned so far thus continuously uses servomotors for the shafts involved with the injection movement, but also for the movement of other shafts of a plastics injection molding machine. Published European Patent Application No. 576 925 too, develops the prior art in such a direction; according to that reference, electrical servomotors cooled by liquid are provided for all shafts in an injection unit. It is also suggested to assign to the drives of the different subassemblies linear potentiometers as an analog path measuring system for the regulation of the position and speed of the electrical servomotors cooled by liquid.

From German Offenlegungsschrift (application published without examination) No. 44 46 857 a process for automatically adjusting an injection speed condition is known. For this purpose a reference pressure is set as a nominal pressure curve and compared with an actual pressure in the mold cavity. If the detected pressure deviates from the nominal (desired) value, the movement of the piston of the feeding means is adjusted correspondingly. This way an over- and under-regulation relative to the nominal pressure curve results, while an adjustment of the curve to the moments at which the respective pressures are achieved is not made.

In European Patent No. 331 735 static sensors are provided for the detection of the injection forces arising during an injection cycle in the bearing area of the feeding means, for example, a feed screw. The measured values gained this way usually are applied to a force- or pressure-dependent injection control, inasmuch as measured values of the internal mold pressure cannot be detected sufficiently or due to the material used cannot be detected reliably from a determined moment in the injection cycle.

From European Patent No. 436 732 it is furthermore known to arrange a pressure sensor for the same purpose in the area of the feed screw itself.

The known devices, however, have the problem that the injection force in an injection molding machine during the injection proper varies in a range of very high magnitudes, usually several tons. During the dosing process, that is, during the material preparation, the resolution, however, should vary only in the kilogram range. Static force transducers, to be sure, can measure continuously starting from a zero point up to the high forces without losing their zero point, they do not have, precisely in the lower range, the desired resolution or, if they do, they are not suited to measure the large forces.

SUMMARY OF THE INVENTION

Based on the above-discussed state of the art, it is an object of the invention to develop a process of the kind mentioned earlier in such a way that a quick injection regulation or control is achieved in a simple and inexpensive manner.

This object and others to become apparent as the specification progresses, are accomplished by the invention, according to which, briefly stated, the method of controlling a parameter (such as speed, pressure or force) derived from motions of a movable unit displaced along a path in an injection molding machine which processes plastifiable materials, includes the following steps:

(a) setting a plurality of arbitrary magnitudes for the parameter for consecutive arbitrary length portions of the path along which the movable unit travels;

(b) setting, along the path, modification positions where a parameter magnitude for one of the length portions is to change to a parameter magnitude of another, consecutive length portion during motion of the movable unit;

(c) computing a nominal parameter-course based on the magnitudes and modification positions set in steps (a) and (b), respectively, wherein the nominal parameter-course is a path/time function for setting a position reference variable to control the parameter during motion of the movable unit;

(d) determining consecutive actual positions of the movable unit during motion thereof;

(e) determining respective consecutive actual points in time at which the movable unit has reached the respective actual positions determined in step (d);

(f) comparing nominal magnitudes with actual magnitudes for determining setting magnitudes to cause the movable unit to adjust to the nominal parameter-course;

(g) determining a presence of any time discrepancy between a nominal point in time, based on the path/time function, at which a given modification position should have been reached by the movable unit and an actual point in time at which the movable unit actually reached the given modification position;

(h) maintaining a previously set setting magnitude for the motion of the movable unit throughout the time discrepancy until the movable unit reaches the given modification position;

(i) upon reaching the given modification position, the actual point in time at which the movable unit has reached the given modification position is equated with the nominal point in time at which the given modification position should have been reached;

(j) superseding the nominal parameter-course by a new nominal parameter-course progressing from the actual point in time at which the given modification position was reached; the new nominal parameter-course corresponding to that portion of the superseded nominal parameter-course which progresses forwardly from the nominal point in time at which the given modification position should have been reached;

(k) adapting the setting magnitudes to the new nominal parameter-course; and (l) at successive modification positions reached by the movable unit, repeating step (j) on the nominal parameter-course determined previously at a respective preceding modification position reached by the movable unit.

The speed, pressure or force according to the invention is derived from a position regulation. Each programmed nominal speed value or nominal pressure value is integrated to obtain a position reference magnitude. The thus proposed nominal position value regulation or control has the advantage that the regulator itself, in a relatively simple manner, can carry out a comparison between the actual value and the pre-calculated reference magnitude, without having to run through an extensive regulation algorithm.

Dynamic influences as for example mass differences or accelerating or braking times can be taken into account without problems by a triggering.

Thus, with the simplest calculation algorithms it is ensured that, as usual in current machines, the material flow, at always constant filling degrees of the mold, is the same independently from any disturbing variables in the former time course. Further, since it is no longer necessary that the drive proper be in a "closed loop", a coarse adjusting compatibility of the process is achieved, independently from the "quality" or "type" or "rigidness" of the drive.

DETAILED DESCRIPTION OF THE PREFERRED EMBODIMENTS

Figure 1:
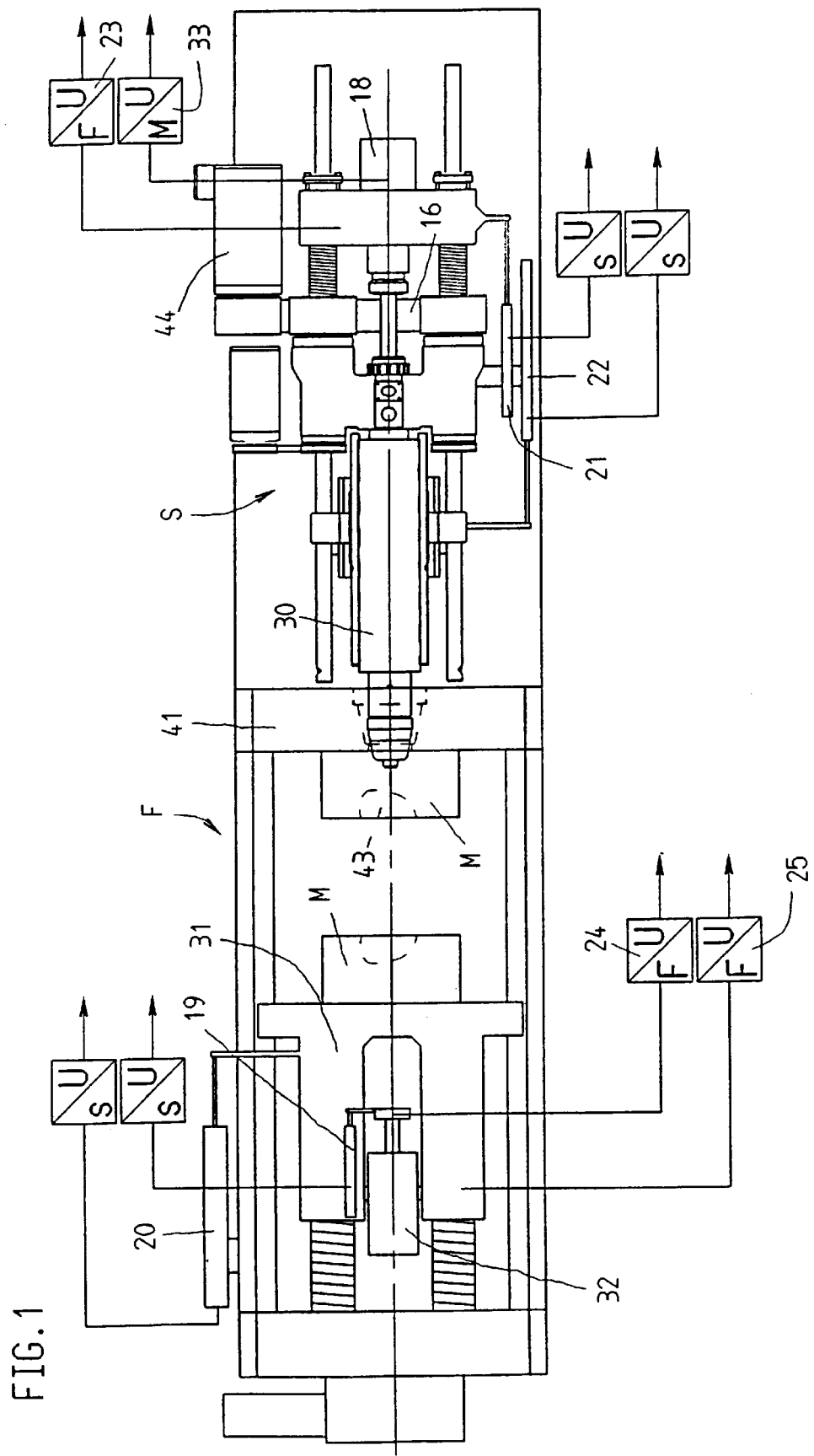
FIG. 1 is a schematic top plan view of an injection molding machine incorporating the invention.

FIG. 1 schematically shows an injection molding machine for processing plastifiable materials, such as plastics, powdery or ceramic masses, especially an injection molding machine for processing plastic materials. On the left side a mold closing unit F, and on the right side an injection unit S are shown. The unit S is electro-mechanically driven, and is moved, for example, by spindles 34. A closing mechanism 31 which is also moved by spindles, is associated with the mold closing unit F. It is to be understood that other types of electro-mechanical drive mechanisms as well as other types of drives, such as hydraulic, pneumatic or the like can be provided for the mold closing unit F as well as for the injection molding unit S. Absolute path measuring systems are assigned to both sides of the injection molding machine. On the mold closing side absolute path measuring systems 19, 20 are provided in the form of linear potentiometers, the values of which are passed via a distance potential transformer to a superordinated control unit C. On the injection molding side there are provided a linear potentiometer as an absolute path measuring system 22 with an associated distance potential transformer for positioning the nozzle at the stationary mold carrier 41 and an absolute path measuring system 21 in the form of a linear potentiometer with an associated distance potential transformer for the movement of a feed screw. The feed screw, designed as a feeding means 10, is moved by a rotational drive 18. A torque sensor/transducer 33 is assigned to the rotational drive 18.

The measured values determined by the sensor system can be used within the framework of a regulation or control of the movement of a driving unit to displace a movable component (hereafter also termed as a movable shaft or a movable unit) of the injection molding machine. On the injection molding side one may consider the injection process, the movement of the injection unit for positioning it at the mold M or on the mold closing side one may consider the mold closing movement. Generally speeds or pressures are regulated over the path s and time t. In the description which follows, however, this regulation or control will be explained in more detail based on an injection regulation or control for the feeding means 10 during the injection of plastifiable material into the mold cavity 43 of the mold M.

Figure 1A:
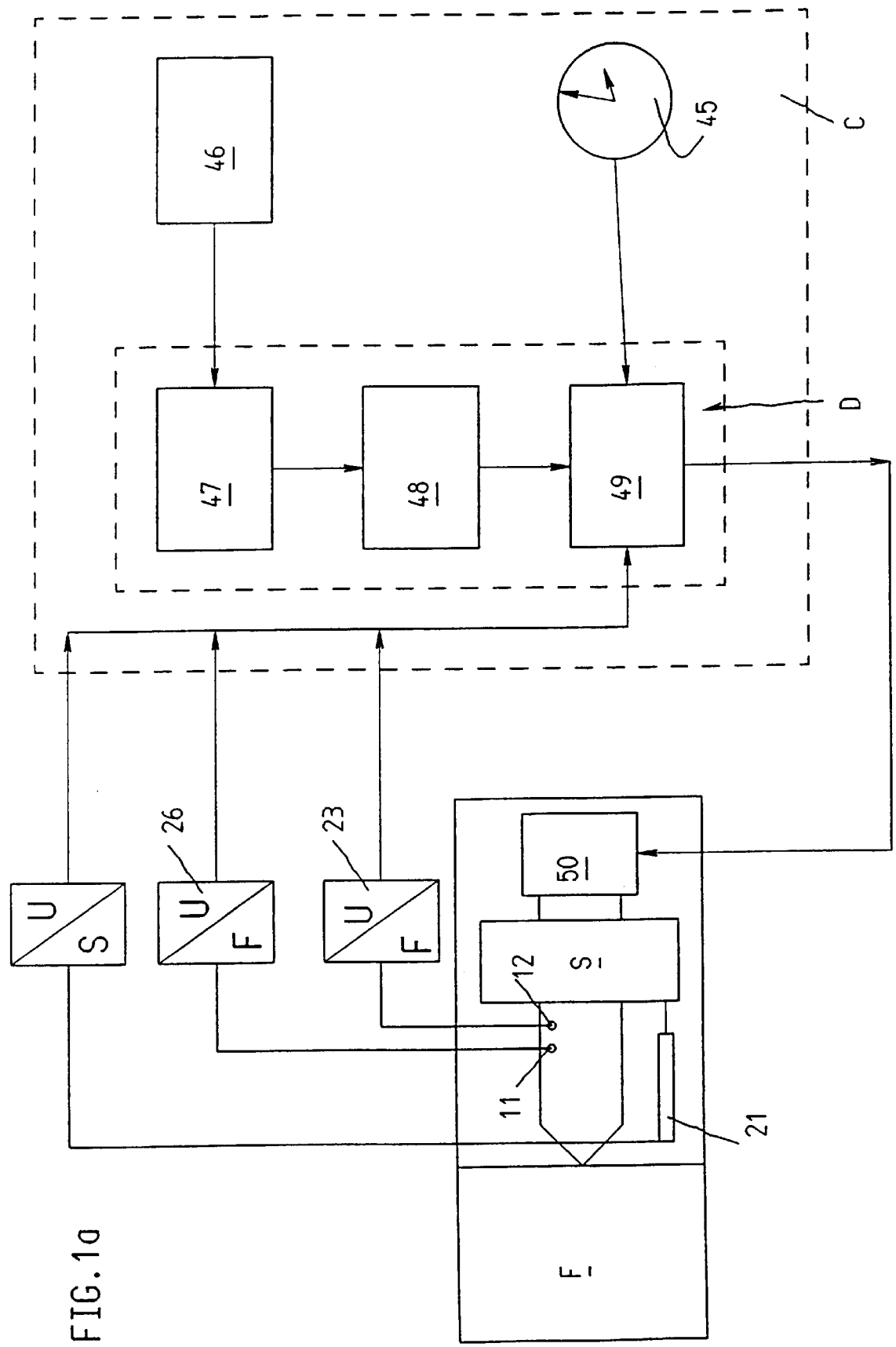
FIG. 1a is a schematic representation of the injection molding machine and a block diagram of the control unit thereof.
Figure 2:
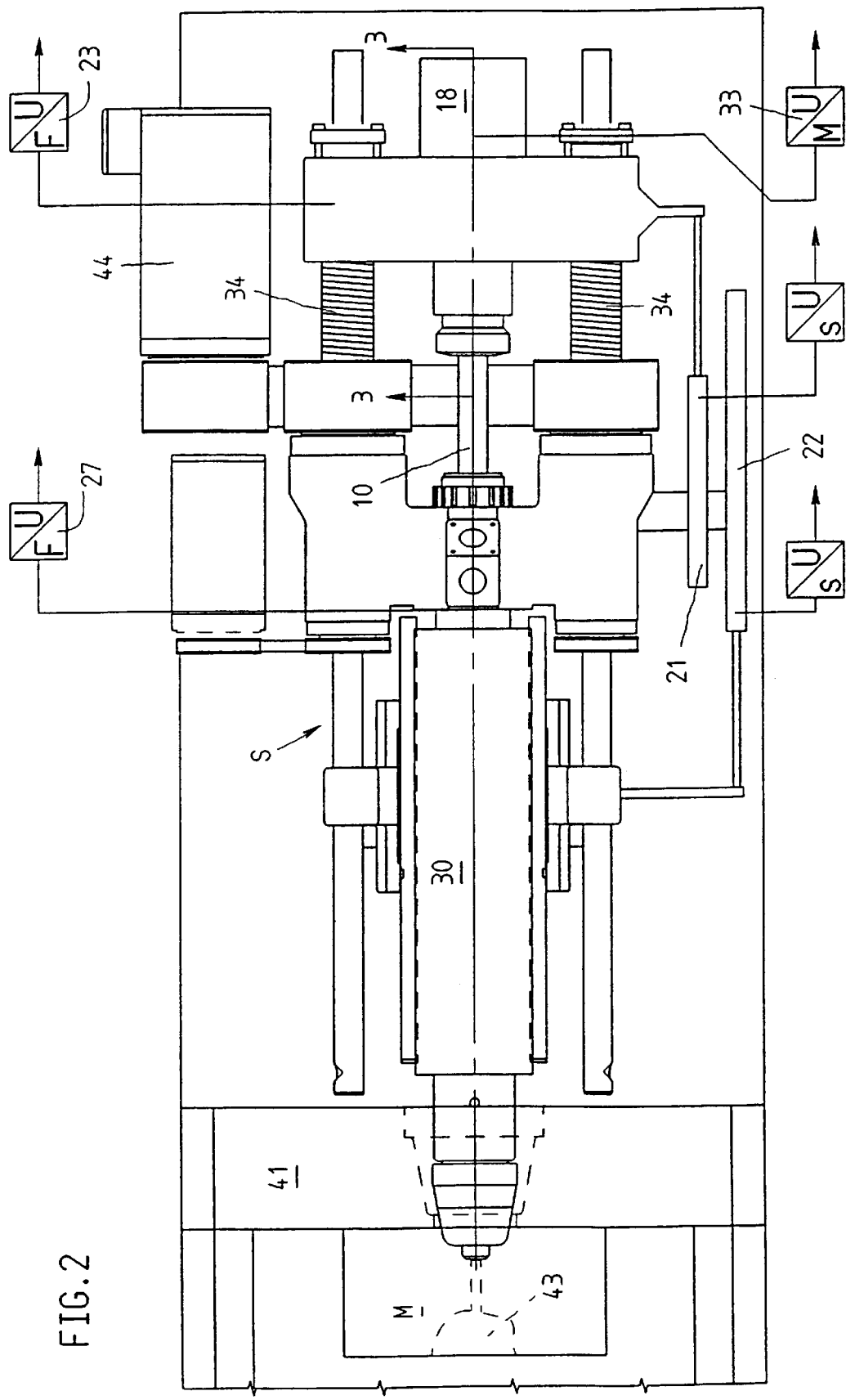
FIG. 2 is an enlarged partial view of FIG. 1 in the zone of the injection molding unit.

A drive motor 44 serves for moving the feeding means 10 axially during the injection. Also referring to FIGS. 1a, 5 and 6, adjusting means 46 serves for adjusting a speed $v_i$ or a force $F_i$ and thus a pressure for a finite number of speed, force or pressure steps and also for setting a respective modification position $s_i$ of the feeding means 10. The modification of the speed or the pressure between adjoining speed or pressure steps occurs at the modification position $s_i$. The set values are stored in storing means 47 of a data processing unit D. Means 48 for calculating a nominal speed curve or a nominal pressure curve and comparison means 49 for comparison of nominal values with actual values are provided, so that always a setting value for the drive motor 44 for tracking the injection unit S corresponding to the nominal curve can be obtained by the motor regulator 50. The explanations which follow are based on a speed regulation. For achieving an analog pressure regulation or force regulation the term "speed" has only to be replaced by "pressure" or "force". The speed, pressure and force variables are also collectively referred to as "parameter".

The speed regulation is essentially based on a position regulation. This is of special advantage, if absolute path measuring systems and no speed sensors are provided at the movable shaft for detecting the actual position values. Each programmed nominal speed value is integrated into a position reference value, while maximum admissible accelerations of the system are taken into account. Protracting errors which eventually might occur at the actual path curve $S_{ist}(t)$, caused by exterior influences like torque limitation, a cascade pressure limitation regulation or finite drive forces, are eliminated at the latest at the next switching point of the speed curve by triggering the nominal switching point to the actual switching point, as will be discussed later. The calculation of the position reference variable is effected in a target-controlled manner, that is, anticipating the next speed switching point, position ramps are pre-calculated with the admissible acceleration and braking force and are coordinated with the actual position values, in order to approach the nominal speed curve. As soon as the movable shaft reaches the position $s_{i+1}$, the ramps are re-calculated on the basis of the then reached time $_{i+1}$, or merely an actual value transfer takes place keeping the originally calculated ramps time-delayed by the difference of $t_i$–$t_1$. Under certain circumstances, for example, in case of ejection units, with which no path measuring systems are associated, it is feasible to preset only the time.

The whole speed regulation thus can be realized in two precision stages. The first stage consists of the position reference regulation with reference value triggering by comparison with the actual value from the external absolute path measuring system and with the subsequent "open loop" drive system at the movable shaft.

The second stage can be realized by a "closed loop" drive at the movable shaft, by providing that a servo drive automatically performs a fine interpolation of path with position regulation by means of an absolute path measuring system or an incremental transmitter.

Although the process is used preferably in connection with electromechanical drives, a corresponding operation with known hydraulic drives is also possible. Different drives for the injection molding machine for processing plastics are distinguished from the point of view of control technology only by the corresponding "rigidity" of the axles, that is, by the admissible accelerations and forces.

Figure 5:
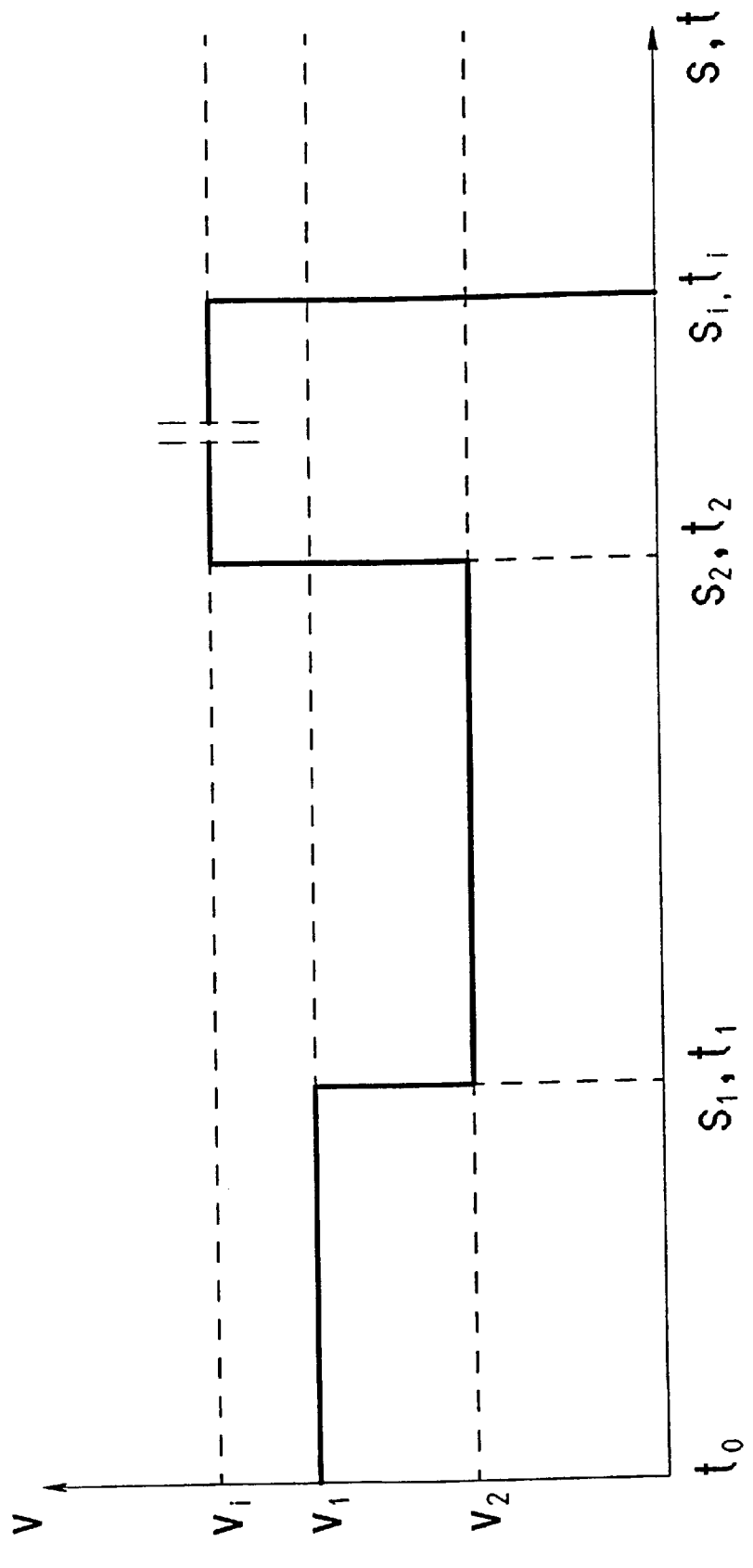
FIG. 5 is a diagram showing a programmed nominal speed curve.
Figure 5A:
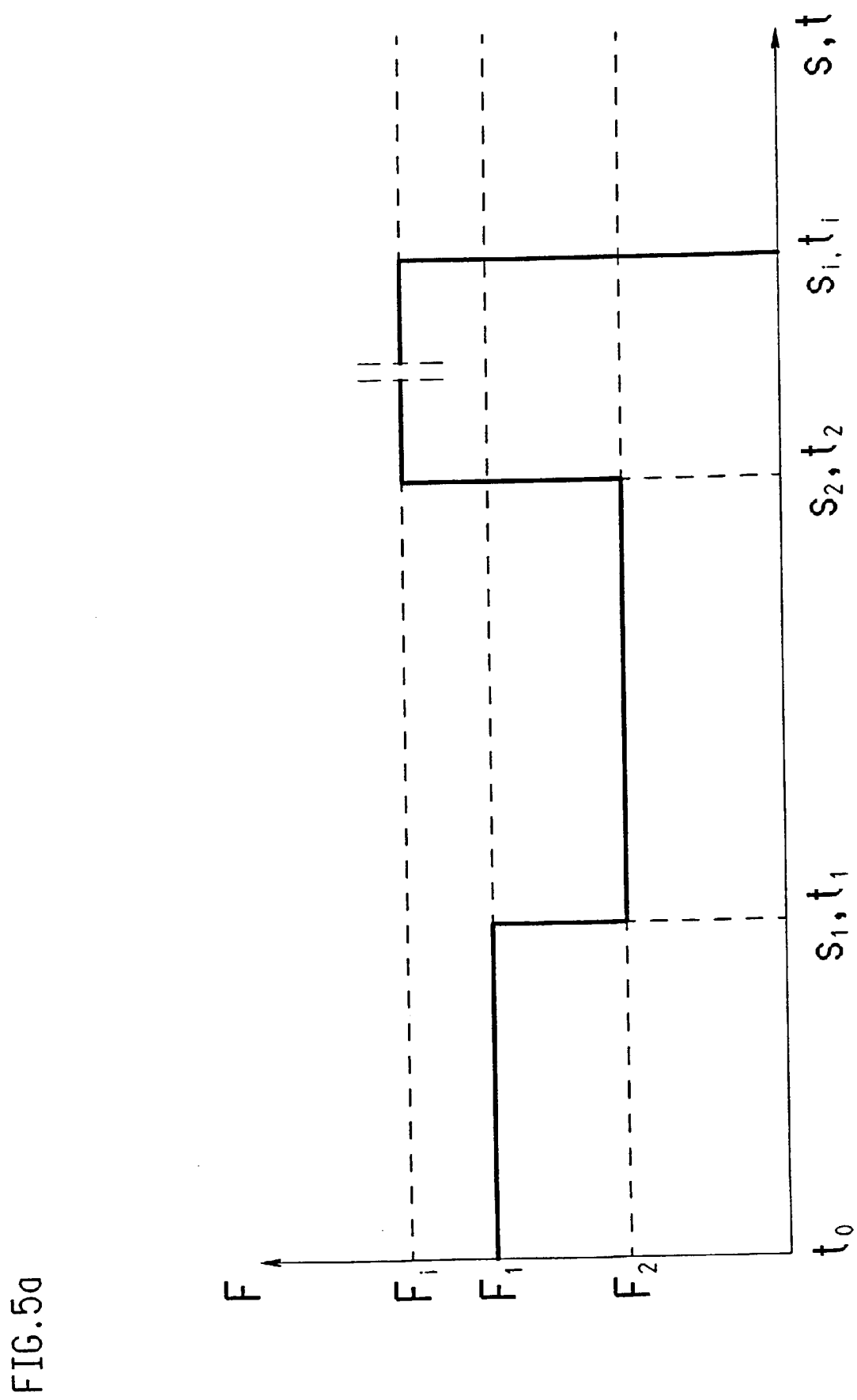
FIG. 5a is a diagram showing a programmed nominal force curve.

According to FIG. 5 the user can input different speed stages. This input is made for example via the adjusting means 46. Thus, nominal (desired) speeds $v_1$, $v_2$ ... $v_i$ between different path points $s_0$, $s_1$, $s_2$, $s_i$ (modification positions) are inputted. FIG. 5a shows a corresponding nominal force curve (or a nominal pressure curve) which can be processed identically to the nominal speed curve as discussed below in connection with FIGS. 6–8.

Figure 6:
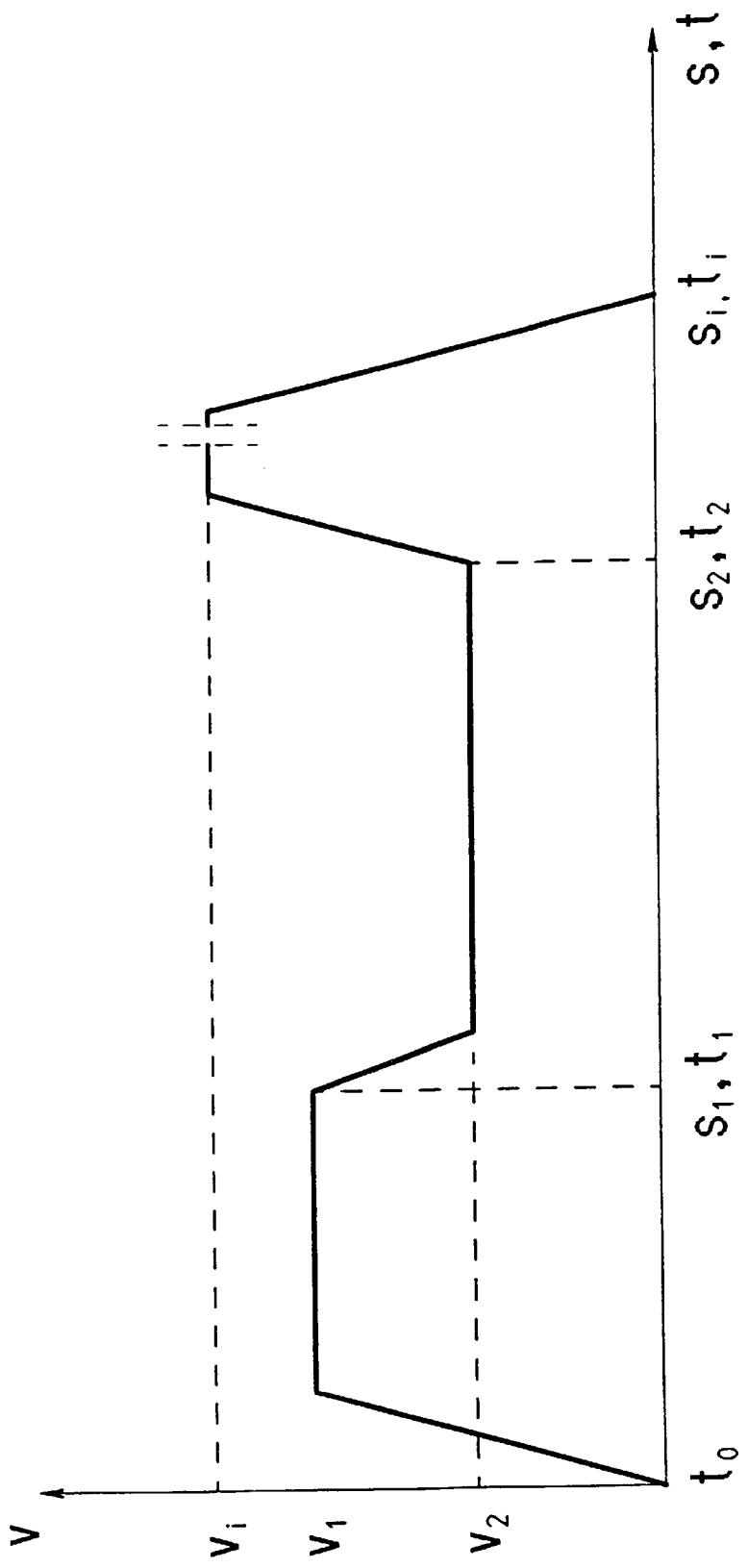
FIG. 6 is a diagram showing a nominal speed curve having ramps provided by internal control.
Figure 7:
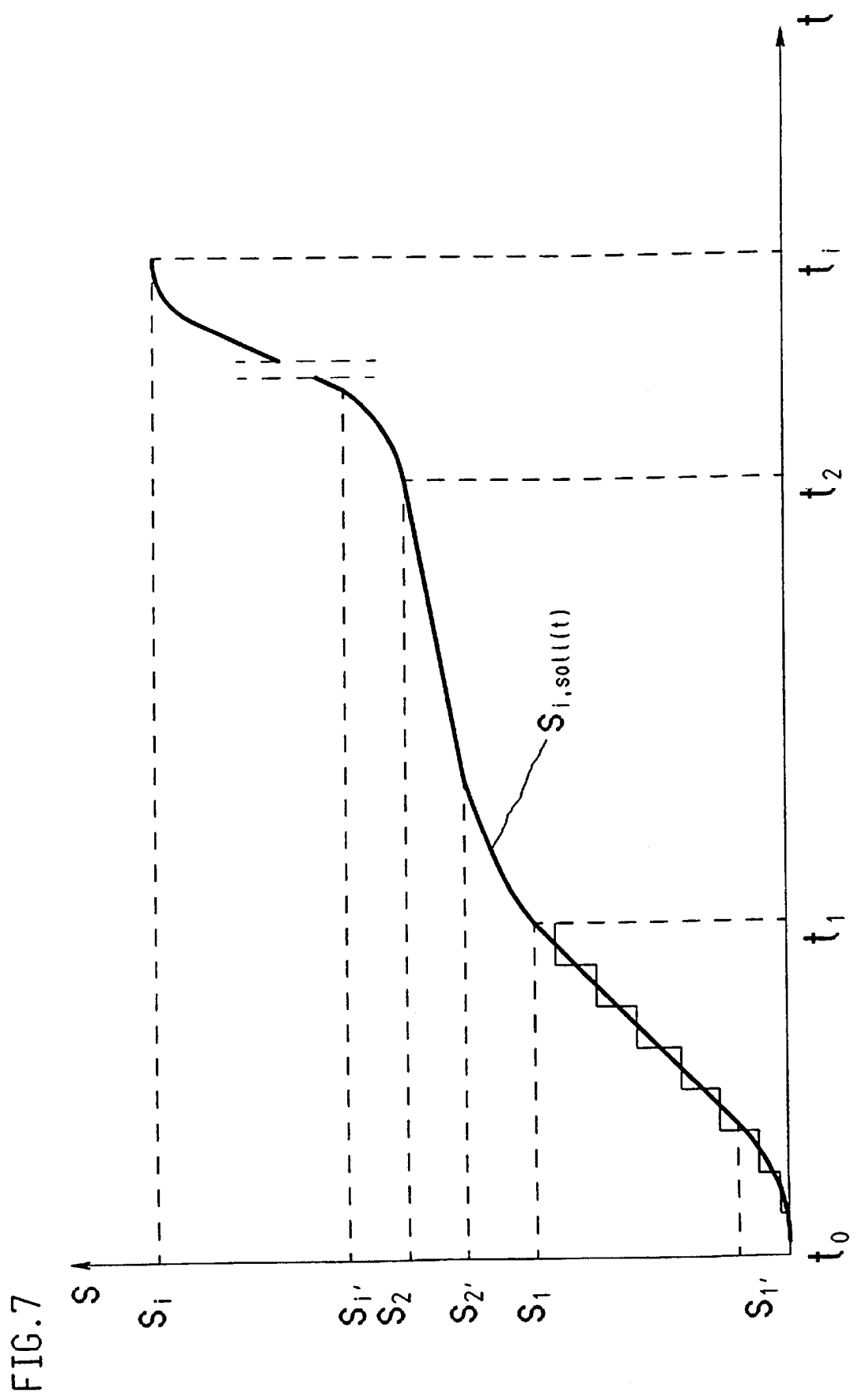
FIG. 7 is a diagram showing a nominal curve (desired curve or reference curve) of a displacement/time function.

According to FIG. 6 the nominal speed curve is provided with ramps by an internal control, in order not to generate infinite accelerations or decelerations. The ramps can have a linear or spline-like character, that is, they can be interpolated in any desired manner between the transition points. From the speed course (FIG. 6) the means 48 obtain for calculation a nominal course of the path s over time t (FIG. 7). For the sake of simplicity, such a calculation is made without consideration of dynamic influences, such as mass differences. Soft transitions in the nominal path/time course result from the ramps obtained by internal control. The path points $s_1$, $s_2$, and $s_{i'}$ mark the transitions, at which the effect of the ramps ends. From these points on the movable shaft has reached its respective nominal speed and has a linear character. The ramps can have any courses and start or end at the modification positions or be calculated beyond these. This course serves as the position reference variable $s_{i,soll}(t)$.

Figure 8:
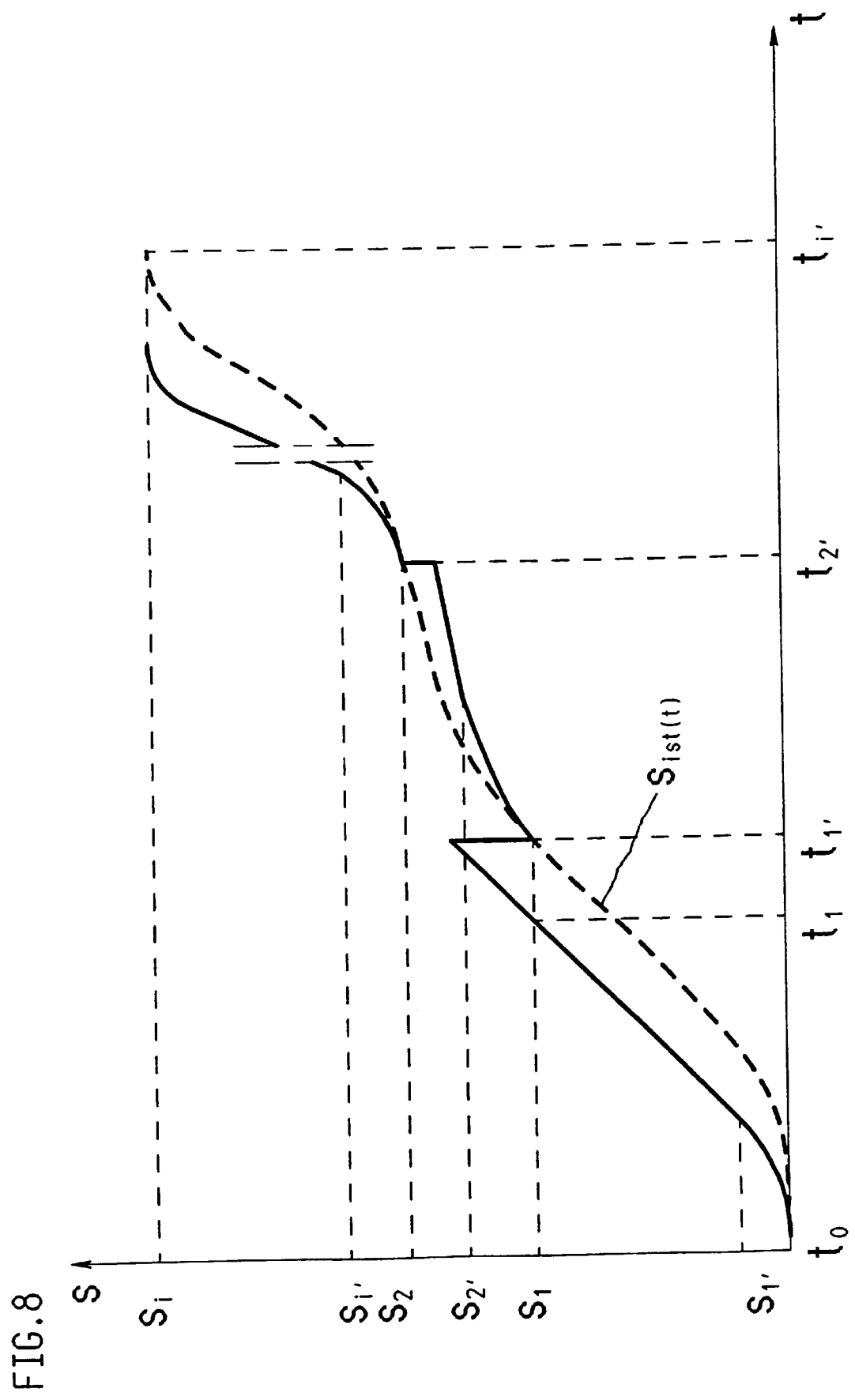
FIG. 8 is a diagram showing a corrected nominal curve (solid line) and an actual curve (broken line) of a displacement/time function.

FIG. 8 shows the nominal course of the path s over time t in sections as a solid line. The dotted curve is the actual path course $s_{ist}(t)$. Since the dynamic influences have not been considered, the dotted curve initially deviates from the ideal line. For example, at the time $t_1$ assigned for the modification position $s_1$, such a position has not yet been reached. For this reason the set value for the drive motor 44 and thus the linear speed are maintained until the modification position $s_1$ is reached, that is, until the comparison means 49 show that the feeding means 10 has reached the modification position $s_1$ which occurs at time $t_{1'}$. At that moment a triggering will be realized for altering the further nominal course from the modification position s, onward by equating the time $t_1$ determined for the modification position with the actual time $t_{1'}$. The same alteration takes place at the modification position $s_2$ at time $t_{2'}$ and at the modification position $s_i$ at time $t_{i'}$.

Recapitulating the essential aspects of the invention, reference is made to FIGS. 6, 7 and 8.

FIG. 7 shows the nominal curve $s_{i,soll}(t)$ representing a path/time function which is obtained by calculating therefrom the nominal speed/time function shown in FIG. 6. In FIG. 8 the solid line curve illustrates the nominal path/time curve modified according to the invention. The actual path/time course $s_{ist}(t)$ is illustrated in broken lines in FIG. 8.

As seen in FIG. 8, according to the nominal (solid-line) course of the path/time function, at time $t_1$ the movable member 10 should reach the location $s_1$. This location, as may be seen in FIG. 6, is one of the desired modification positions where the speed is to change according to a preset value. FIG. 8 shows, however, that, as indicated by the broken-line actual curve of the path/time function, at moment $t_1$ the modification position $s_1$ has not yet been reached. Conventionally this would mean that a correction signal is applied to the drive motor to adjust the actual curve. The method according to the invention, however, operates differently: the signal for the drive motor is maintained, that is, the nominal curve continues until the movable member 10 in fact reaches the modification position $s_1$, which, according to FIG. 8, occurs at time $t_{1'}$. At that moment the control apparatus performs a triggering step: it equates the actual time $t_{1'}$ (that is, the time of arrival of the movable member 10 at the modification position $s_1$) with the nominal time $t_1$ and modifies the desired curve from time $t_{1'}$ onward to have a shape as it had originally from desired time $t_1$ onward. It is thus seen that the solid-line curve portion extending from $t_{1'}$ to $t_{2'}$ in FIG. 8 is identical to a corresponding length portion extending from time $t_1$ in FIG. 7. Stated differently, whatever course the desired curve had from time $t_1$ onward (FIG. 7) is now shifted to time $t_{1'}$ (FIG. 8). The "triggering" represented by the solid line vertical drop at time $t_{1'}$ is well seen in FIG. 8. Based on the same considerations, a subsequent "triggering" is performed at time $t_{2'}$. In that case, however, the movable member 10 has reached the modification position $s_2$ earlier than the moment $t_2$ (not shown in FIG. 8) and consequently, there the "triggering" takes place as a vertical rise, thus, in a direction opposite to that described in connection with the time $t_{1'}$.

Thus, according to the invention the nominal path/time curve is modified step by step at each preset modification position $s_i$ in case the movable member 10 has reached such modification position not at the desired time $t_i$, but at a time $t_{i'}$ which may be before or after the desired time $t_i$ for the modification position $s_i$. Therefore, in essence, a control of the actual motion with respect to a desired (reference) motion is effected not by causing the actual motion curve to meander about a fixed desired curve as it has been done conventionally, but it is the nominal curve which is stepwise adjusted and thus control signals are generated based on the adjusted nominal (reference) curve to cause the actual curve to approach the reference curve.

The use of the position reference variable has the advantage, especially when absolute path measuring systems 19, 20, 21 and 22 are applied, that a direct comparison of the actual value detected by the absolute path measuring system with the nominal value can be made and the regulation algorithm, which has to run very fast, becomes extremely simple. The calculation of the reference variable, on the other hand, can be effected significantly slower in order to ensure an accurate run of the machine. The use of absolute path measuring systems in the form of linear potentiometers renders a complex reference run of the individual movable shafts of the injection molding machine unnecessary after voltage loss or when work starts, since the absolute path measuring system always knows immediately, at which spot the injection molding unit is located.

Figure 9:
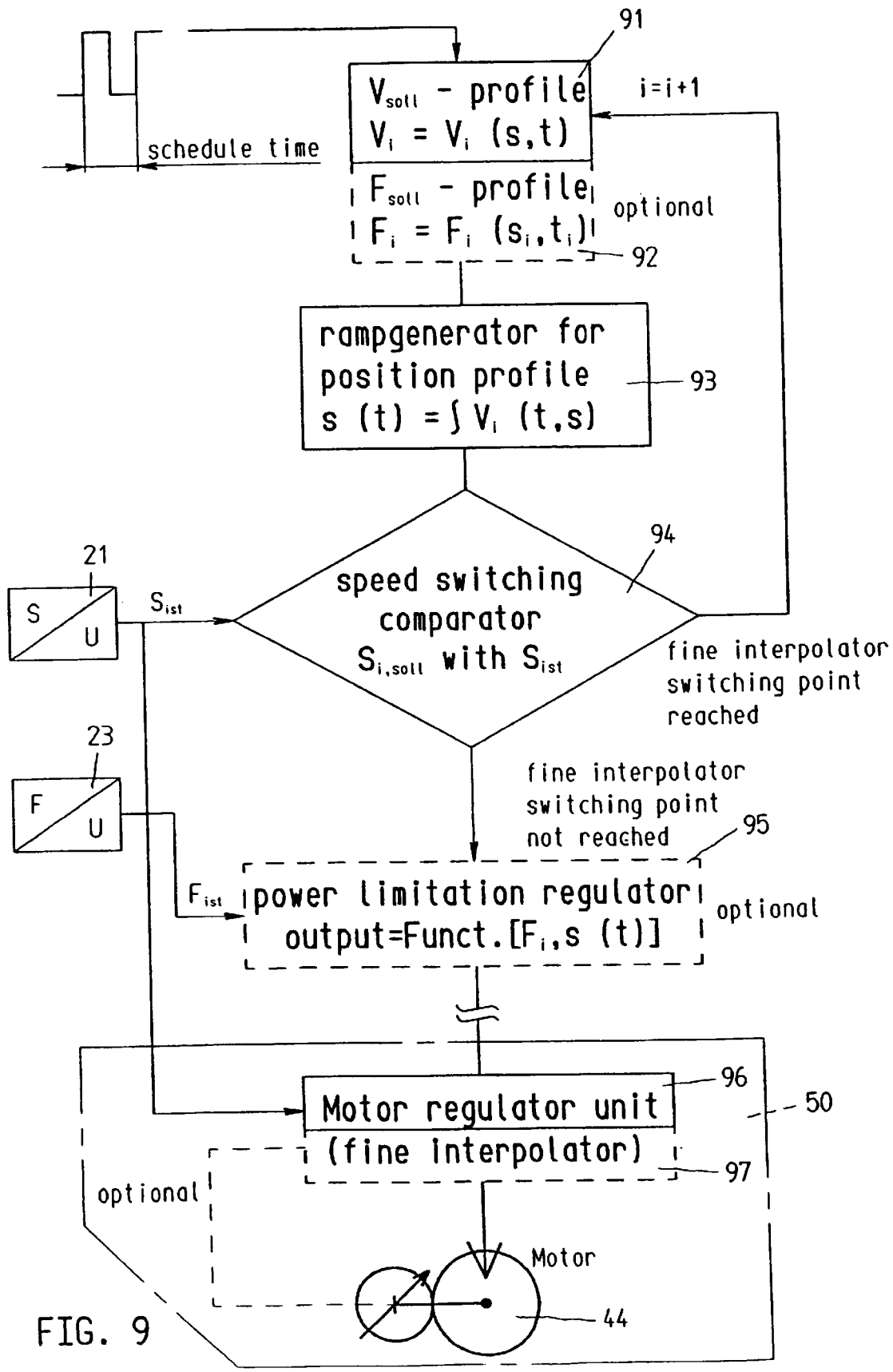
FIG. 9 is a flow diagram for the speed regulation, and optionally also the force regulation over the path and over the time, respectively.

FIG. 9 shows a flow diagram for the speed regulation (or the force or pressure regulation according to FIG. 5*a*). The regulation is effected based on the path s or the time t. The sequence having steps 91–97 is run periodically by the superordinated control unit C, for example, at 10 ms intervals. As switching point that point becomes effective at which determined positions $s_i$ are reached. The force regulation can be carried out optionally as a superordinated limiting regulation or even as a real superimposed pressure regulation. In the simplest case it can be omitted altogether; then the force (pressure) at the movable shaft is determined by the torque, which the drive can generate. If in a pressure limiting regulation a preset force limiting value is reached, the position reference variable is weakened, because the force limiting regulation acts or intervenes as a superimposed regulator, and, if necessary, affects in the same manner the earlier described speed regulation.

In step 91, as shown in FIG. 5, a nominal speed curve is preset and calculated via the setting means 46. A determined time t or path s is assigned to each speed. Alternatively or supplementarily a force or pressure curve can be calculated in step 92. The curves obtained in this way are provided with ramps (step 93) by a ramp generator as shown in FIG. 6. Then, during the injection, in step 94 the comparison means 49 becomes active. As a result the actual value $s_{ist}$ of the absolute path measuring system 21 is entered. If the switching point is not reached, the motor adjuster or motor regulator continues receiving a signal according to step 96. According to step 95 it is possible to apply optionally or alternatively a force limiting regulator which receives its measured value from the force transducer 23. If the switching point has been reached, the control unit reverts to step 91 and by setting i=i+1, the algorithm continues with the next speed reference point.

In case the incremental transmitter in the motor or the absolute path measuring system emits no signal concerning the actual position, a simple control is feasible. For example, it is possible to preset only the starting point and the end point. As soon as the movable shaft reaches its destination, the new speed is preset without testing in the meantime the behavior of the drive. Thus, the step-like intermediate operations of FIG. 7 would be omitted.

Figure 3:
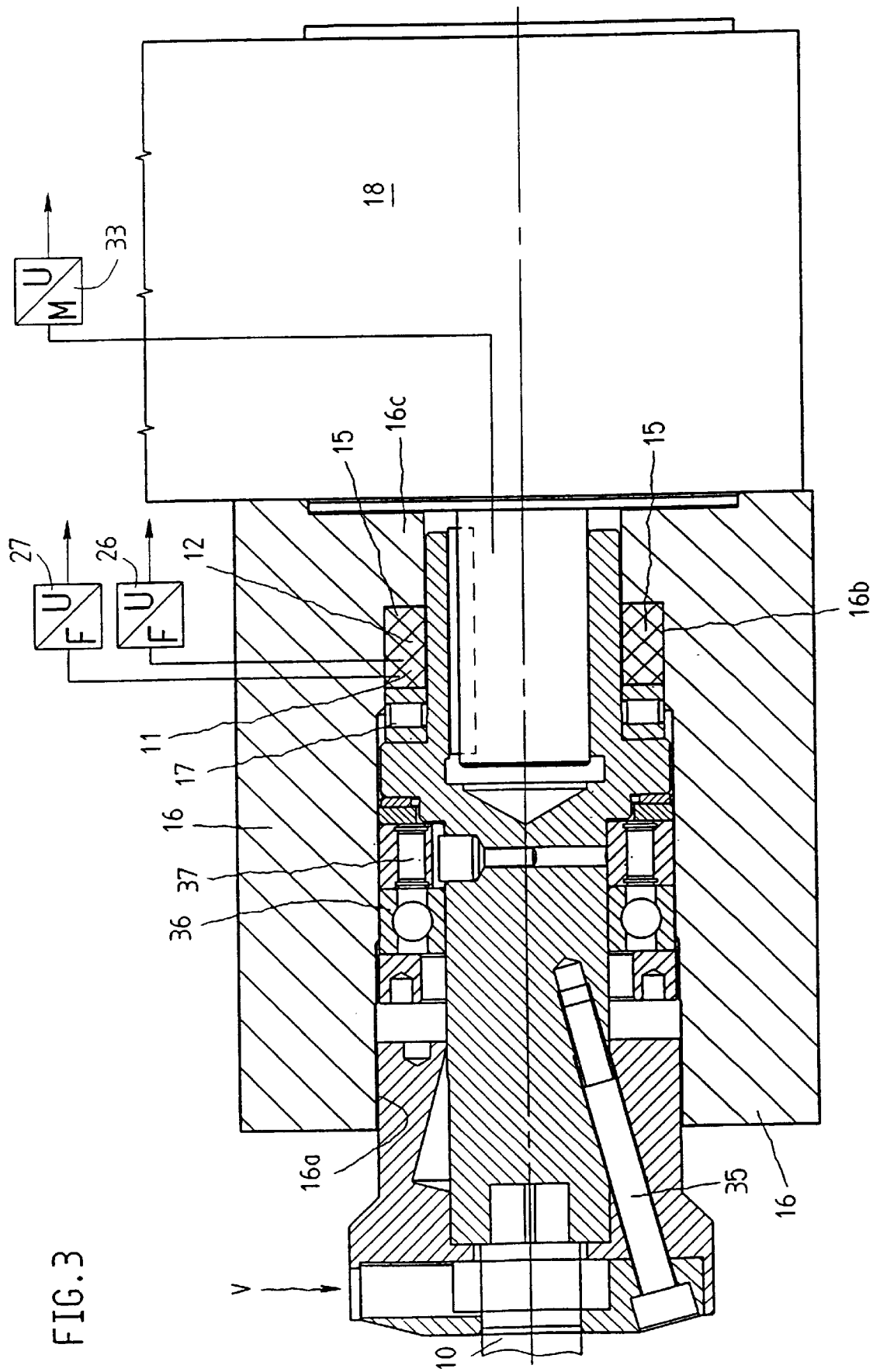
FIG. 3 is a sectional view along line 3—3 of FIG. 2.

FIG. 3 is an enlarged sectional view of the bearing region of the feeding means 10. On the left side a locking mechanism V is shown which is connected with the shaft of the rotational drive 18 via fixing means 35. Such a locking mechanism is described in detail in German Patent No. 42 36 282.

In a bore hole 16*a* of the injection bridge 16 the shaft is supported on bearings 36, 37 and the rotational motor 18 is arranged on the side opposite to the stationary mold carrier 41 of the injection bridge 16. At the bottom of the bore hole 16*a* a recess 16*b* is provided, which receives a force measuring ring 15. In the force measuring ring two sensors are disposed. The measured values detected by the sensors are transmitted to the control unit C via the force/voltage transducers assigned to the force sensors 26, 27. The force measuring ring 15 is particularly useful when a static sensor is provided in connection with a dynamic sensor, since in such a case they can be easily integrated in the force measuring ring. The first static sensor 11 serves for determining the small forces arising during the dosing and the material preparation, whereas the dynamic sensor 12 works in the remaining force range, as will be discussed in more detail below. The force measuring ring 15 is arranged between the axial thrust bearing 17 and a projection 16*c* of the injection bridge 16 in such a way that it encloses the drive shaft 18*a* of the rotational drive 18.

Figure 4:
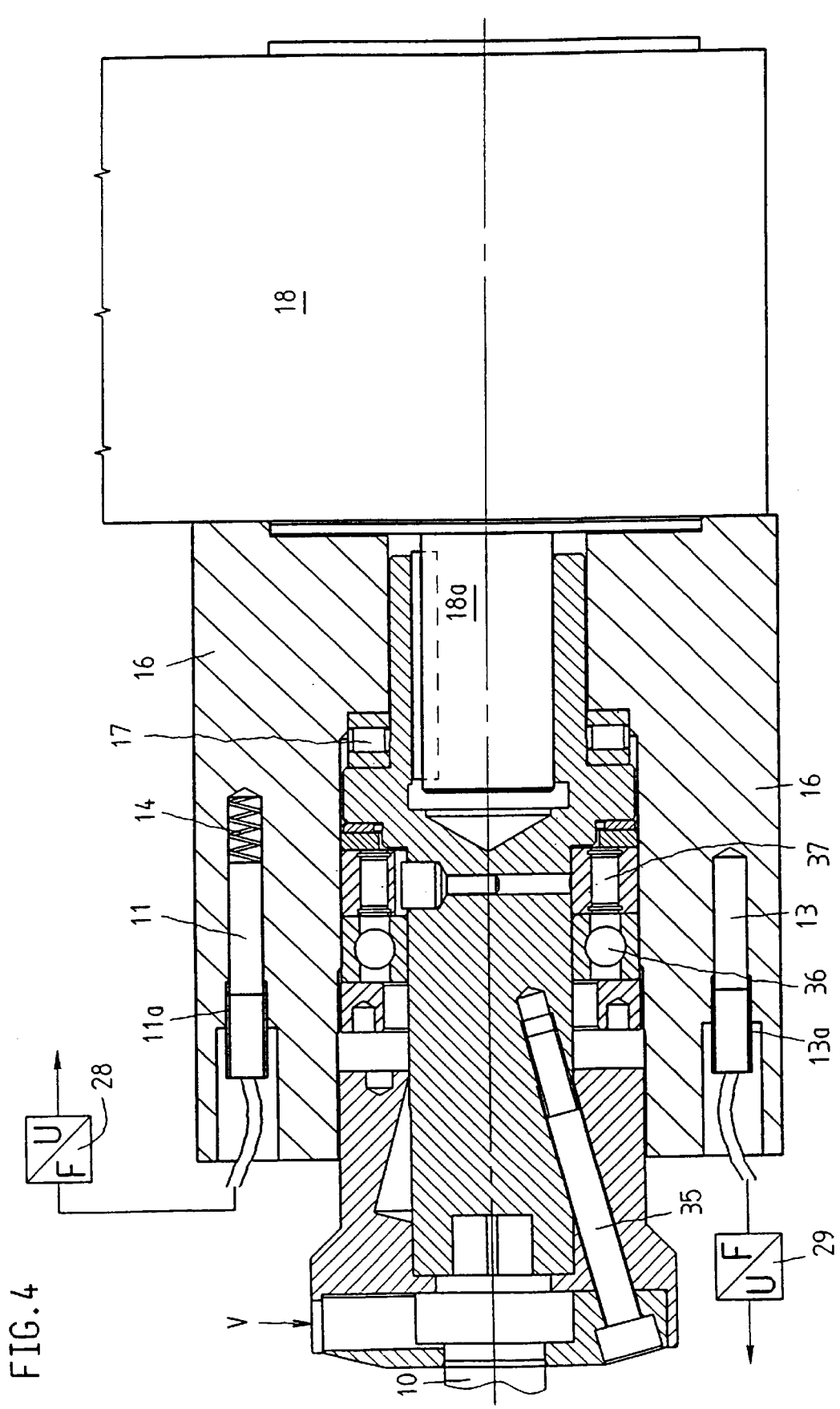
FIG. 4 is a representation similar to FIG. 3 showing a further embodiment.

According to a variant shown in FIG. 4, a first static sensor 11 is provided which is loaded by a spring 14. The sensor is, as the second static sensor 13, screwed to the injection bridge via thread sections 11*a*, 13*a*. Deformations of the injection bridge 16 produce values measured by the sensors. The spring force of the spring 14 is degressive and is coordinated with a predetermined limit value F1 in such a way that if the limit value is exceeded, the first static sensor is decoupled from the force flux by the spring which prevents the transmission of further deformations (and thus the forces) to the first static sensor 11. This prevents a destruction of the sensor at a maximum injection force, since the spring 14 acts like a bypass. The first static sensor 11 thus measures in a range of smaller forces from, for example, 1%–25% of the maximum forces, preferably in a force range which usually is not exceeded during the dosing. In the range of larger forces a further sensor becomes active as a second static sensor 13. The first static sensor 11 transmits a signal to the control unit via the force sensor 28 and the second static sensor 13 transmits a signal to the control unit via the force sensor 29. The sensors can be formed as strain gauge strips. In both cases the sensors can be adjusted or biased in order to be suited to measure tensile forces as well as pressure forces. This ensures the possibility to perform monitoring, regulation or control during the whole injection cycle.

The sensors determine the forces arising at the feeding means 10 of the injection molding unit S. Such forces are characteristic of a pressure which is exerted by the material to be processed on the feeding means 10, and are detected by the sensors, for example, for use within the framework of an injection regulation. At least one first static sensor 11 has a high resolution and serves in essence for determining the forces, arising during the material preparation, in the form of a first measured value. A further force sensor as a second static sensor 13 or a dynamic sensor 12 is assigned to the first static sensor 11. Such static sensor 13 essentially determines the forces, arising during the injection, in the form of a second measured value. A switch-over or transfer is effected at a transfer point P (FIG. 11), as soon as the first measured value reaches a predetermined limit value F1. At the transfer point P the first static sensor 11 transfers, for example, at time $t_ü1$ the further detection of the force to a further sensor; at this point the force is fixed, so that at the same time the further sensor can be calibrated or can be set to zero. Thus a starting point results essentially for a dynamic sensor 12, so that in each injection cycle a reset of the dynamic sensor is effected and a drifting of the measured value or sensor signal is avoided. The dynamic sensor 12 or the second static sensor 13 is then adapted to detect the injection forces which are large compared with those arising during the material preparation.

Figure 10:
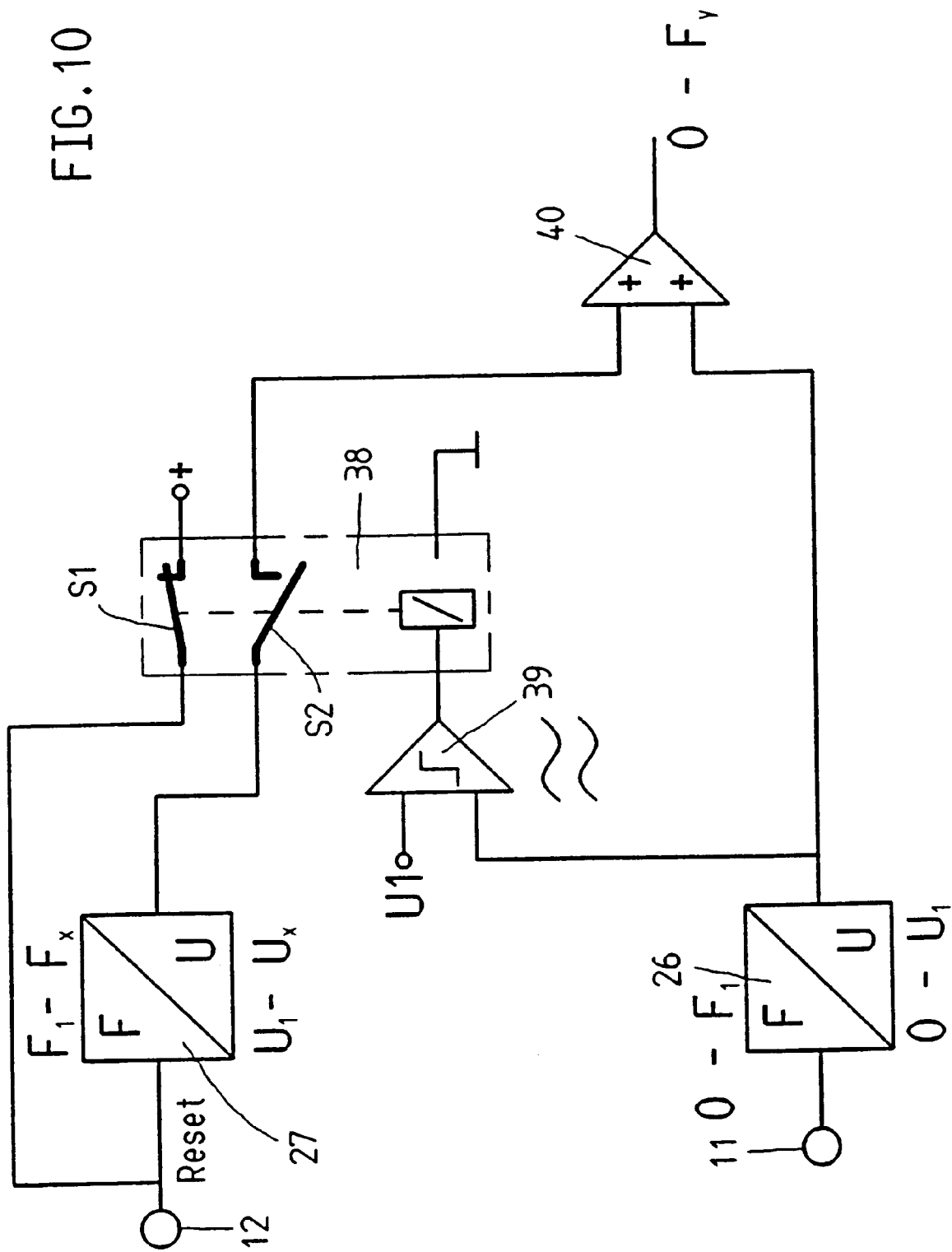
FIG. 10 is a circuit diagram for the sensors.

FIG. 10 shows the operation when two sensors as shown in FIGS. 3 and 4 are used. The first static sensor 11 supplies a measured value via the force sensor/transducer 26. The measured value is applied to the comparator 39 which compares it with a reference value corresponding to a predetermined limit value F1. Dependent from the result of this comparison the second measured value of the dynamic sensor is not yet coupled in. In such a case the position of the switches S1, S2 is as shown. Thus only the first measured value detected by the first static sensor 11 is inputted in the summarizer 40. If the predetermined limit value is reached, the control means 38 transmits a signal to the switches S1, S2. Thus switch S1 is opened and the force sensor/transducer 27 leaves the reset condition. From now on the dynamic sensor 12 also delivers a second measured value via the force sensor/transducer 27. In the summarizer 40 now two measured values are available which are added to one another, so that even above the predetermined limit value F1 a continuous measuring result from zero to Fx is achieved up to the maximum injection force Fx. This leads to the required range division. In the example of FIG. 3 this evaluation logic is located in the force measuring ring, so that this decision need not be made by the control. In FIG. 4 the evaluation logic is located, for example, in a non-illustrated switching cabinet.

Figure 11:
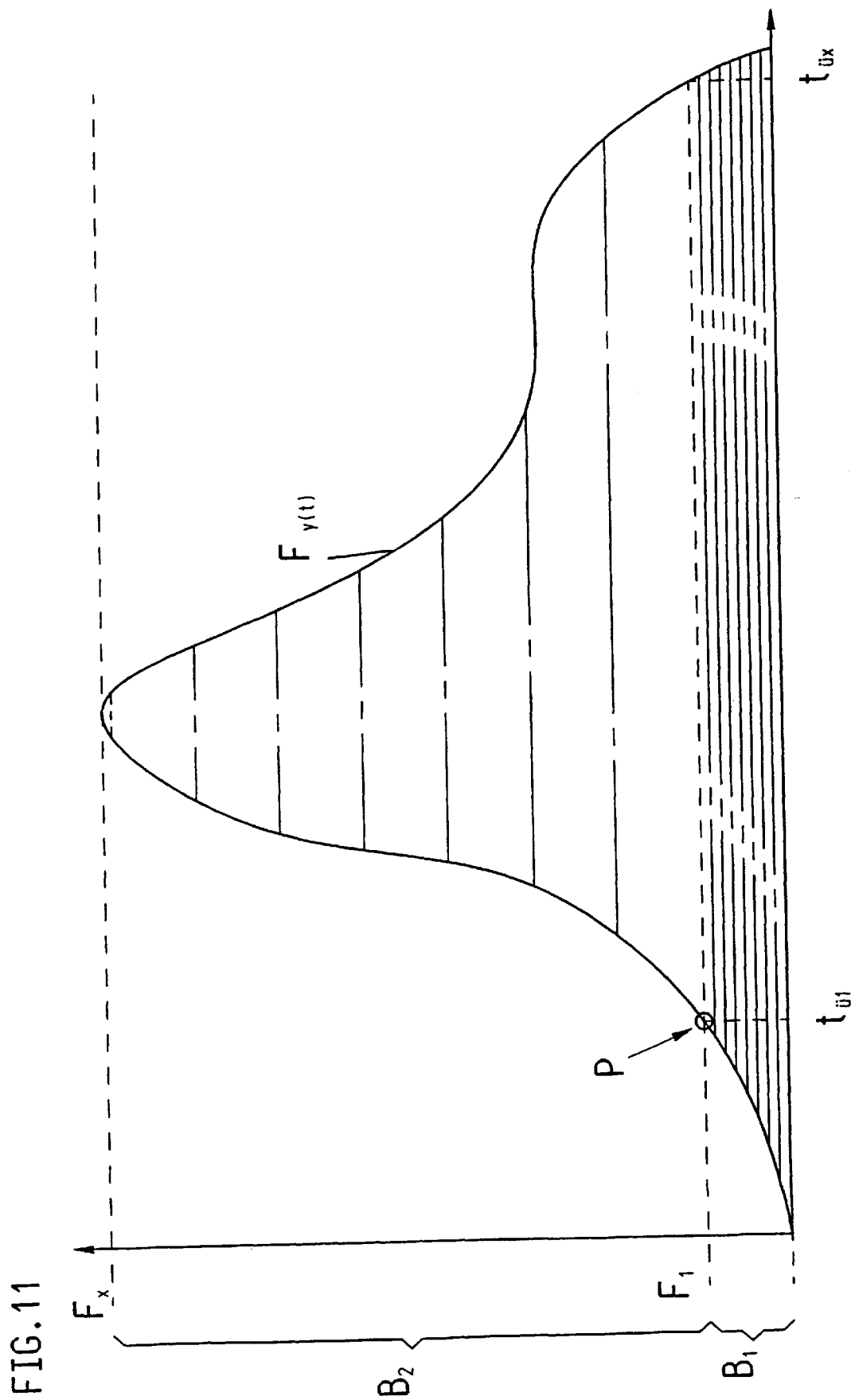
FIG. 11 is a diagram showing a force/time relationship during the injection process.

FIG. 11 illustrates a corresponding force measuring division. In the measuring range B1 of the force F from zero to F1 the first static sensor 11 operates, whereas the further sensor is active in the measuring range above the predetermined limit value F1 up to the maximum injection force Fx. The transfer is effected at the transfer point P at time $t_ü1$ and in the whole following range until time $t_üx$ the force in essence is detected by the further sensor in the form of the force time course $F_{y(t)}$. After the time $t_üx$ again the first static sensor 11 becomes active.

It will be understood that the above description of the present invention is susceptible to various modifications, changes and adaptations, and the same are intended to be comprehended within the meaning and range of equivalents of the appended claims.

I claim:

1. A method of controlling a parameter derived from motions of a movable unit displaced along a path in an injection molding machine which processes plastifiable materials; said parameter being selected from the group consisting of speed, pressure and force; said method comprising the following steps:

(a) setting a plurality of arbitrary magnitudes for said parameter for consecutive arbitrary length portions of said path;

(b) setting, along said path, modification positions where a parameter magnitude for one of said length portions is to change to a parameter magnitude of another, consecutive length portion during motion of the movable unit;

(c) computing a nominal parameter-course based on the magnitudes and modification positions set in steps (a) and (b), respectively, wherein said nominal parameter-course is a path/time function for setting a position reference variable to control said parameter during motion of the movable unit;

(d) determining consecutive actual positions of said movable unit during motion thereof;

(e) determining respective consecutive actual points in time at which said movable unit has reached respective said actual positions determined in step (d);

(f) comparing nominal magnitudes with actual magnitudes for determining setting magnitudes to cause the movable unit to adjust to the nominal parameter-course;

(g) determining a presence of any time discrepancy between a nominal point in time, based on said path/time function, at which a given modification position should have been reached by said movable unit and an actual point in time at which said movable unit actually reached said given modification position;

(h) maintaining a previously set setting magnitude for the motion of said movable unit throughout said time discrepancy until said movable unit reaches said given modification position;

(i) upon reaching said given modification position, the actual point in time at which said movable unit has reached said given modification position is equated with the nominal point in time at which said given modification position should have been reached;

(j) superseding said nominal parameter-course by a new nominal parameter-course progressing from said actual point in time at which said given modification position was reached; said new nominal parameter-course corresponding to that portion of the superseded nominal parameter-course which progresses forwardly from said nominal point in time at which said given modification position should have been reached; and (k) adapting said setting magnitudes to said new nominal parameter-course.

2. The method as defined in claim 1, wherein said movable unit is a mold closing unit of said injection molding machine and wherein steps (a) through (k) are performed on said mold closing unit.

3. The method as defined in claim 1, wherein said movable unit is an injection molding unit of said injection molding machine and wherein steps (a) through (k) are performed on said injection molding unit.

4. The method as defined in claim 1, wherein said movable unit is a feed screw of an injection molding unit of said injection molding machine and wherein steps (a) through (k) are performed on said feed screw.

5. The method as defined in claim 1, further comprising the step of comparing position values of said nominal path/time function with measured values of actual positions of said movable unit.

6. The method as defined in claim 1, wherein said parameter is speed; further comprising the steps of performing a force-limiting regulation and superposing said force-limiting regulation on the speed regulation by performing steps (a) through (k) while selecting the force as said parameter.

7. The method as defined in claim 1, wherein at successive modification positions reached by said movable unit, repeating step (j) on the nominal parameter-course determined previously at a respective preceding modification position reached by said movable unit.

8. The method as defined in claim 7, wherein said movable unit is a mold closing unit of said injection molding machine and wherein steps (a) through (k) and said repeating step are performed on said mold closing unit.

9. The method as defined in claim 7, wherein said movable unit is an injection molding unit of said injection molding machine and wherein steps (a) through (k) and said repeating step are performed on said injection molding unit.

10. The method as defined in claim 7, wherein said movable unit is a feed screw of an injection molding unit of said injection molding machine and wherein steps (a) through (k) and said repeating step are performed on said feed screw.

11. The method as defined in claim 7, further comprising the step of comparing position values of said nominal path/time function with measured values of actual positions of said movable unit.

12. The method as defined in claim 7, wherein said parameter is speed; further comprising the steps of performing a force-limiting regulation and superposing said force-limiting regulation on the speed regulation by performing steps (a) through (k) and said repeating step while selecting the force as said parameter.

* * * * *